(12) United States Patent
Wang et al.

(10) Patent No.: US 11,824,705 B2
(45) Date of Patent: *Nov. 21, 2023

(54) RADIO RESOURCE CONFIGURATION METHOD AND DEVICE, USER EQUIPMENT AND NETWORK ELEMENT

(71) Applicant: ZTE CORPORATION, Guangdong (CN)

(72) Inventors: Xin Wang, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,869

(22) Filed: Jun. 3, 2022

(65) Prior Publication Data

US 2022/0303173 A1    Sep. 22, 2022

Related U.S. Application Data

(63) Continuation of application No. 16/575,229, filed on Oct. 23, 2019, now Pat. No. 11,356,322, which is a
(Continued)

(30) Foreign Application Priority Data

Mar. 24, 2017   (CN) .......................... 201710184480.5

(51) Int. Cl.
*H04L 41/0681* (2022.01)
*H04L 41/0806* (2022.01)
(Continued)

(52) U.S. Cl.
CPC ...... *H04L 41/0681* (2013.01); *H04L 41/0806* (2013.01); *H04W 76/15* (2018.02); *H04W 76/27* (2018.02); *H04W 88/06* (2013.01)

(58) Field of Classification Search
CPC ........ H04J 3/14; H04L 43/50; H04L 12/2697; H04L 43/00; H04L 12/2602;
(Continued)

(56) References Cited

U.S. PATENT DOCUMENTS

2013/0028069 A1    1/2013  Pelletier et al.
2014/0192775 A1    7/2014  Li et al.
(Continued)

FOREIGN PATENT DOCUMENTS

CN    101330753 A    12/2008
CN    101646242 A     2/2010
(Continued)

OTHER PUBLICATIONS

First Office Action for CN Appl. No. 2017101844805, dated Sep. 28, 2022 (with English translation, 12 pages).
(Continued)

*Primary Examiner* — Peter G Solinsky
*Assistant Examiner* — Sanjay K Dewan
(74) *Attorney, Agent, or Firm* — Foley & Lardner LLP

(57) ABSTRACT

Disclosed are a radio resource configuration method and apparatus, a user equipment and a network element. The radio resource configuration method includes that: a user equipment (UE) receives a message of a radio resource configuration from a first signaling radio bearer (SRB) of a first radio access technology (RAT), where the message carries information of a first configuration, and the first configuration is a configuration of a radio resource of the first RAT; and when the UE fails to configure the radio resource of the first RAT according to the information of the first configuration, the UE sends a response message of the radio resource configuration to indicate that the radio resource configuration of the first RAT fails.

20 Claims, 7 Drawing Sheets

Related U.S. Application Data continuation of application No. PCT/CN2018/080307, filed on Mar. 23, 2018.

(51) Int. Cl.
*H04W 76/15* (2018.01)
*H04W 76/27* (2018.01)
*H04W 88/06* (2009.01)

(58) Field of Classification Search
CPC .......... H04L 41/0681; H04L 41/0806; H04W 76/27; H04W 76/15
USPC ........................................................ 370/242
See application file for complete search history.

(56) References Cited

U.S. PATENT DOCUMENTS

| | | |
|---|---|---|
| 2015/0133122 A1 | 5/2015 | Chen |
| 2015/0173120 A1 | 6/2015 | Yamada |
| 2015/0215965 A1 | 7/2015 | Yamada |
| 2016/0192249 A1 | 6/2016 | Wu |
| 2016/0262194 A1 | 9/2016 | Zhang et al. |
| 2016/0302256 A1 | 10/2016 | Susitaival et al. |
| 2016/0380779 A1 | 12/2016 | Sharma et al. |
| 2017/0034866 A1 | 2/2017 | Wager et al. |
| 2017/0055187 A1 | 2/2017 | Kang et al. |
| 2017/0195935 A1 | 7/2017 | Xu et al. |
| 2018/0049214 A1 | 2/2018 | Kubota et al. |
| 2018/0184475 A1 | 6/2018 | Babaei et al. |
| 2018/0199315 A1 | 7/2018 | Hong et al. |
| 2019/0289510 A1 | 9/2019 | Rugeland et al. |
| 2021/0058831 A1 | 2/2021 | Sharma et al. |

FOREIGN PATENT DOCUMENTS

| | | |
|---|---|---|
| CN | 101651899 A | 2/2010 |
| CN | 103379563 A | 10/2013 |
| CN | 103703860 A | 4/2014 |
| EP | 3 041 310 A1 | 7/2016 |
| WO | WO-2013/163814 A1 | 11/2013 |
| WO | WO-2014/031989 A1 | 2/2014 |

OTHER PUBLICATIONS

ITRI, "Control plane signalling transport for LTE-NR tight interworking" 3GPP TSG-RAN WG2 Meeting #97 Tdoc, R2-1701344, Feb. 17, 2017, Athens, Greece (3 pages).
Extended European Search Report on EP 18771617.0 dated Mar. 13, 2020 (13 pages).
Final Office Action on U.S. Appl. No. 16/575,229 dated Aug. 16, 2021.
First Office Action for JP Appl. No. JP 2019-551975 dated Dec. 22, 2020 (with English Translation, 5 pages).
Huawei et al.: "Failure handling on RRC configuration for LTE NR tight interworking" 3GPP TSG-RAN WG2 #97; R2-1700299; Feb. 17, 2017; Athens, Greece (5 pages).
International Search Report and Written Opinion for International Appl. No. PCT/CN2018/080307, dated May 23, 2018.
ITRI: "Control plane signalling transport for LTE-NR tight interworking" 3GPP TSG-RAN WG2 Meeting #97; R2-1701344; Feb. 17, 2017; Athens, Greece (5 pages).
Notice of Allowance on U.S. Appl. No. 16/575,229 dated Feb. 7, 2022.
U.S. Office Action on U.S. Appl. No. 16/575,229 dated Mar. 2, 2021.
3rd Generation Partnership Project, "Technical Specification Group Radio Access Network; Evolved Universal Terrestrial Radio Access (E-UTRA); Radio Resource Control (RRC); Protocol specification (Release 14)", 3GPP TS 36.331 V14.1.0, Dec. 2016, France (654 pages).
3rd Generation Partnership Project, "Technical Specification Group Radio Access Network; Study on New Radio Access Technology; Radio Interface Protocol Aspects (Release 14)", 3GPP TR 38.804 V1.0.0, Mar. 2017, France (56 pages).
Huawei et al., "Failure handling on RRC configuration for LTE NR tight interworking", 3GPP TSG-RAN WG2 #97, R2-170xxxx (Resubmission of R2-1700299), Feb. 17, 2017, Athens, Greece (3 pages).
Huawei et al., "Report and summary of email discussion [87#22] [LTE/DC] S-RLF and Reestablishment", 3GPP TSG-RAN WG2 Meeting #87, R2-144540, Oct. 10, 2014, Shanghai, China (29 pages).
Nokia et al., "Secondary RLM aspects for LTE-NR tight interworking", 3GPP TSG-RAN WG2 NR Adhoc, R2-1700804, Feb. 17, 2017, Athens, Greece (3 pages).

RADIO RESOURCE CONFIGURATION METHOD AND DEVICE, USER EQUIPMENT AND NETWORK ELEMENT

CROSS-REFERENCE TO RELATED APPLICATIONS

This application claims the benefit of priority under 35 U.S.C. § 120 as a continuation of U.S. Non-Provisional patent application Ser. No. 16/575,229, filed on Oct. 23, 2019, which is a continuation of PCT Patent Application No. PCT/CN2018/080307, filed on Mar. 23, 2018, which claims priority to Chinese patent application No. 201710184480.5, filed on Mar. 24, 2017, the entire disclosure of each of which is incorporated herein by reference in its entirety.

TECHNICAL FIELD

The present disclosure relates to the technical field of communications, for example, relates to a radio resource configuration method and apparatus, a user equipment and a network element.

BACKGROUND

In the era when the fourth generation (4G) communication system has matured, research into the fifth Generation (5G) communication system has been started in the field in order to seek better communication experience.

An E-UTRAN NodeB (eNB) is deployed in a 4G radio access network (RAN), uses a long term evolution (LTE) radio access technology (RAT) over a radio interface and accesses an evolved packet core (EPC). Different from such LTE eNB, a generation NodeB (gNB) is deployed in a 5G RAN, uses a new radio (NR) RAT over the radio interface and accesses a next generation core (NGC).

In order to make full use of the widely deployed LTE eNB, the industry proposes a system architecture for providing communication services for a user equipment (UE) in a manner of tight coupling and interoperation between an LTE eNB and an NR gNB, which is referred to as LTE-NR tight interworking, and the UE is also referred to as a user terminal. The tight coupling and interoperation between LTE and NR refers to that the UE can use the radio resources of the two RATs at the same time, and is correspondingly scheduled by the two RAT schedulers separately. The two independent schedulers are respectively located in two nodes in the RAN, and the two nodes are connected via an interface between ideal or non-ideal network elements. In the core network, the UE still has only one connection of a control plane (CP) interface.

SUMMARY

A radio resource configuration method includes the steps described below.

A UE receives a message of a radio resource configuration from a first signaling radio bearer (SRB) of a first RAT, where the message carries information of a first configuration, and the first configuration is a configuration of a radio resource of the first RAT.

in response to determining that the UE fails to configure the radio resource of the first RAT according to the information of the first configuration, the UE sends a response message of the radio resource configuration to indicate that the radio resource configuration of the first RAT fails.

A radio resource configuration apparatus is configured in a UE and includes a reception module, a configuration module and a response module.

The reception module is configured to receive a message of a radio resource configuration from a first SRB of a first RAT, where the message carries information of a first configuration, and the first configuration is a configuration of a radio resource of the first RAT.

The configuration module is configured to configure the radio resource of the first RAT according to the information of the first configuration.

The response module is configured to: in response to determining that the configuration of the radio resource of the first RAT fails, send a response message of the radio resource configuration to indicate that the radio resource configuration of the first RAT fails.

A UE includes a memory and a processor.
The memory is configured to store program codes.
The processor is configured to read the program codes for performing following processing:
   receiving a message of a radio resource configuration from a first SRB of a first RAT, where the message carries information of a first configuration, and the first configuration is a configuration of a radio resource of the first RAT; and
   in response to determining that the configuration of the radio resource of the first RAT performed according to the information of the first configuration fails, sending a response message of the radio resource configuration to indicate that the radio resource configuration of the first RAT fails.

A radio resource configuration method includes the steps described below.

A first network element using a first RAT receives and processes, through an SRB of the first RAT, a response message of a radio resource configuration returned by, where the response message carries report information about a failure of radio resource configuration of a second RAT. The first network element and a second network element using the second RAT simultaneously provide a communication service for the UE over a radio interface, the first network element establishes an only control plane interface between the UE and a core network, and the first RAT is different from the second RAT.

A radio resource configuration apparatus is configured in a first network element using a first RAT) and includes a processing module.

The processing module is configured to receive and process, through an SRB of the first RAT, a response message of radio resource configuration returned by a UE, where the response message carries report information about a failure of a radio resource configuration of a second RAT. The first network element and a second network element using the second RAT simultaneously provide a communication service for the UE over a radio interface, the first network element establishes an only control plane interface between the UE and a core network, and the first RAT is different from the second RAT.

A network element includes a memory and a processor.
The memory is configured to store program codes.
The processor is configured to read the program codes for performing following processing: receiving and processing, through an SRB of a first RAT, a response message of radio resource configuration returned by a UE, where the response message carries report information about a failure of a radio resource configuration of a second RAT.

The network element using the first RAT and the first network element using a second RAT simultaneously provide a communication service for the UE over a radio interface, and the network element establishes an only control plane interface between the UE and a core network.

A radio resource configuration method includes the steps described below.

A first network element sends a message of radio resource configuration to a UE through an SRB of a first RAT established between the first network element and the UE, where the message carries information of a first configuration, and the first configuration is a configuration of a radio resource of the first RAT performed by the first network element for the UE.

The first network element receives and processes report information about failure of the radio resource configuration of the first RAT from the UE, or receives and processes a result of a radio resource management decision performed according to the report information by a second network element.

The first network element using the first RAT and the second network element using a second RAT simultaneously provide a communication service for the UE over a radio interface, and the second network element establishes an only control plane interface between the UE and a core network.

A radio resource configuration apparatus is configured in a first network element using a first RAT and includes a sending module and a processing module.

The sending module is configured to send a message of a radio resource configuration to a UE through an SRB of the first RAT established between the first network element and the UE, where the message carries information of a first configuration, and the first configuration is a configuration of a radio resource of the first RAT performed by the first network element for the UE.

The processing module is configured to receive and process report information about a failure of the radio resource configuration of the first RAT from the UE, or receive and process a result of a radio resource management decision performed according to the report information by a second network element.

The first network element and the second network element using a second RAT simultaneously provide a communication service for the UE over a radio interface, and the second network element establishes an only control plane interface between the UE and a core network.

A network element includes a memory and a processor.

The memory is configured to store program codes.

The processor is configured to read the program codes for performing following processing:

sending a message of radio resource configuration to a UE through an SRB of a first RAT established between the network element and the UE, where the message carries information of a first configuration, and the first configuration is a configuration of a radio resource of the first RAT performed by the network element for the UE; and receiving and processing report information about a failure of the radio resource configuration of the first RAT from the UE, or receiving and processing a result of a radio resource management decision performed according to the report information by a first network element.

The network element using the first RAT and the first network element using a second RAT simultaneously provide a communication service for the UE over a radio interface, and the second network element establishes an only control plane interface between the UE and a core network.

A computer-readable storage medium is configured to store computer-executable instructions for executing any method described above.

DETAILED DESCRIPTION

Figure 1:
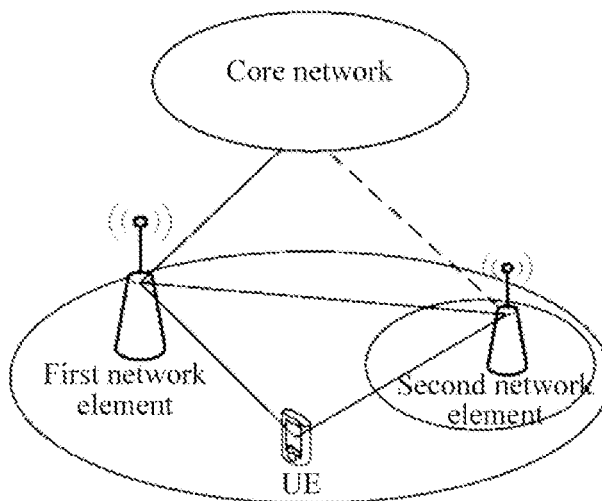
FIG. 1 is a schematic diagram of a network architecture of a communication system in which two network elements simultaneously provide a service for a UE over a radio interface.

Referring to FIG. 1, in a system architecture for providing a communication service for a UE in a manner of tight coupling and interoperation between an LTE eNB and an NR gNB, two network elements simultaneously provide a communication service for a UE over a radio interface. Hereinafter, a serving network element establishing an only control plane interface between the UE and a core network is referred to as a first network element, a serving network element providing additional radio resources for the UE is referred to as a second network element, the first network element also establishes a user plane (UP) interface between the UE and the core network, and the UP interface between the second network element and the core network is optional.

In terms of the radio interface, the first network element uses a first RAT, such as an LTE RAT, and the second network element uses a second RAT, such as an NR RAT. In some examples, UP data transmission is performed between the first network element and the UE and between the second network element and the UE. An SRB of the first RAT is established between the first network element and the UE to transmit control plane signaling, such as radio resource control (RRC) signaling, while an SRB of the second RAT established between the second network element and the UE is optional. Hereinafter, the SRB of the first RAT is also referred to as a first SRB, and the SRB of the second RAT is referred to as a second SRB.

From the perspective of radio resource management (RRM), the first network element is responsible for a configuration of a radio resource of the first RAT for the UE, which is referred to as a first configuration, and the second network element is responsible for a configuration of a radio resource of the second RAT for the UE, which is referred to as a second configuration. The first configuration and the second configuration are independent of each other while satisfying a certain range (for example, the sum of the first configuration and the second configuration cannot exceed the radio capability of the UE).

In the related art, when a UE in the RRC Connected state cannot receive the radio resource configuration issued by the serving network element (that is, the configuration fails), the UE triggers a resume procedure such as an RRC connection re-establishment procedure. However, this causes interruption of data transmission of the user plane, which increases the complexity of the UE executing the procedure and signaling transmission load of the control plane. Even if the resume procedure is successfully executed, a certain time is required to resume the data transmission over the radio interface. Therefore, how to improve the user experience of the UE by handling the radio resource configuration failure in the system shown in FIG. 1, such as a tight coupling and interoperation system, is a problem.

Some embodiments relate to radio resource configuration on the UE side.

The based system architecture is referred to FIG. 1 and the description thereof. In some embodiments, the first network element and the second network element simultaneously provide a communication service for the UE over the radio interface in a manner of tight coupling and interoperation, the first network element establishes an only control plane interface between the UE and the core network, the SRB of the first RAT is established between the first network element and the UE, and the SRB of the second RAT is not established between the second network element and the UE. In some embodiments, the first RAT used by the first network element is one of an LTE RAT and an NR RAT, the second RAT used by the second network element is the other one of the LTE RAT and the NR RAT, and as far as the first RAT is different from the second RAT. In some embodiments, the first network element and the second network element are an eNB and a gNB, respectively.

Figure 2:
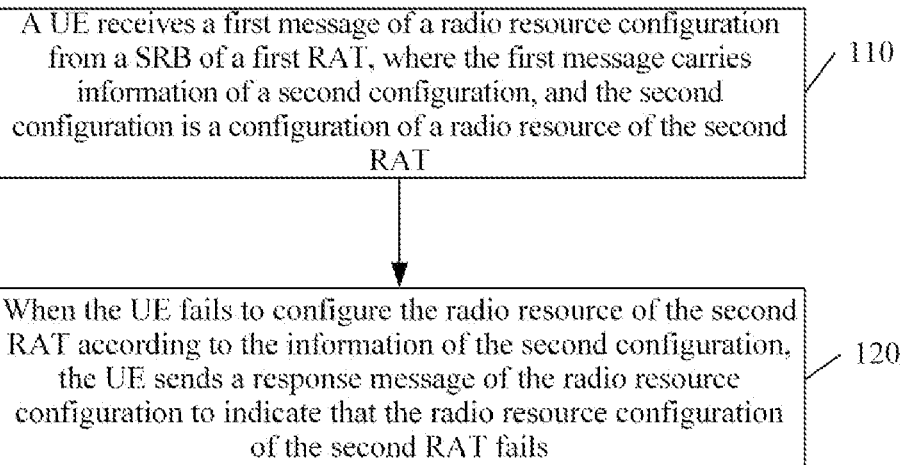
FIG. 2 is a flowchart of a radio resource configuration method at a UE side according to some embodiments.

An embodiment provides a radio resource configuration method. As shown in FIG. 2, the method includes steps described below.

In step 110, the UE receives a first message of radio resource configuration from an SRB of a first RAT. The first message carries information of a second configuration, and the second configuration is a configuration of a radio resource of the second RAT.

In some embodiments, the first message of the radio resource configuration is any message, such as an RRC connection reconfiguration message, for performing the radio resource configuration.

In the method embodiment, the SRB of the first RAT is an SRB established between the UE and a first network element of the first RAT, and the second configuration is a configuration performed by a second network element of the second RAT for the UE.

In some embodiments, the first message of the radio resource configuration further carries information of the first configuration. The first configuration is a configuration of a radio resource of the first RAT performed by the first network element for the UE.

In some embodiments, the radio resource configuration method further includes: when the UE successfully configures the radio resource of the first RAT according to the information of the first configuration, a response message of the radio resource configuration sent by the UE carries indication information indicating that the radio resource configuration of the first RAT is successful. In some embodiments, the indication information indicating that the radio resource configuration of the first RAT is successful and the report information indicating that the radio resource configuration of the second RAT fails are both carried in an RRC signaling. In some embodiments, the indication information indicating that the radio resource configuration of the first RAT is successful and the report information indicating that the radio resource configuration of the second RAT fails are respectively carried in different RRC signalings.

In step 120, when the UE fails to configure the radio resource of the second RAT according to the information of the second configuration, the UE sends a response message of the radio resource configuration to indicate that the radio resource configuration of the second RAT fails.

In some embodiments, the response message of the radio resource configuration described above is any message, such as an RRC connection reconfiguration complete message, a message for secondary cell group (SCG) failure information or other RRC messages, in response to the received message of the radio resource configuration. In some embodiments, other RRC messages are RRC messages sent by the UE to the base station, such as an RRC message sent by the UE to the base station (e.g., an RRC connection resume message) in the 3rd Generation Partnership Project (3GPP) Technical Specification (TS) 38.331 V15.0.0 (2017-12).

In some embodiments, the response message of the radio resource configuration carries the report information about failure of the radio resource configuration of the second RAT. The report information includes at least one of the following information:

assistance information for assisting a network side in reconfiguring the radio resource of the second RAT; or
indication information about the failure of the radio resource configuration of the second RAT.

In some embodiments, the assistance information includes at least one of the following information: a failure cause or a configuration part which is not able to be used in the second configuration. In some embodiments, the assistance information includes a measurement result of the UE on a radio channel of the second RAT, and at least one of the following the information: the failure cause or the configuration part which is not able to be used in the second configuration.

In some embodiments, the indication of the failure of the UE to configure the radio resource of the second RAT is an explicit indication. In some embodiments, the indication of the failure of the UE to configure the radio resource of the second RAT is an implicit indication. When the indication of the failure of the UE to configure the radio resource of the second RAT is the explicit indication, the response message includes indication information indicating that the radio resource configuration of the second RAT fails. When the indication of the failure of the UE to configure the radio resource of the second RAT is the implicit indication, the response message does not include the indication information indicating that the radio resource configuration of the second RAT fails. A network element at the network side determines that the UE fails to configure the radio resource of the second RAT according to the assistance information (such as at least one of a failure cause or a configuration part which is not able to be used in the second configuration), or it is agreed that when the indication information indicating that the radio resource configuration of the second RAT succeeds is not received, it is considered that the radio resource configuration of the second RAT fails.

In some embodiments, the report information about failure of the radio resource configuration of the second RAT is coded by using ASN.1 corresponding to the first RAT. The UE sends the response message of the radio resource configuration through the SRB of the first RAT, and reports the report information to the first network element for processing. In other embodiments, the report information about failure of the radio resource configuration of the second RAT is coded by using ASN.1 corresponding to the second RAT. The UE sends the response message of the radio resource configuration through the SRB of the first RAT, carries the report information in a container of the response message, and forwards the container through the first network element to the second network element for processing. In some embodiments, the ASN.1 corresponding to the first RAT and the ASN.1 corresponding to the second RAT are different. When a radio resource management decision is performed by the first network element after the radio resource configuration of the second RAT fails, the ASN.1 corresponding to the first RAT is used to code the report information. When the radio resource management decision is performed by the second network element after the radio resource configuration of the second fails, the ASN.1 corresponding to the second RAT is used to code the report information, the coded report information is carried in the container, and the first element directly forwards the container to the second network element without any processing.

Figure 3A:
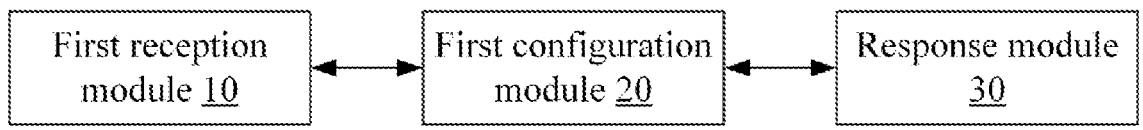
FIG. 3A is a diagram of modules of a radio resource configuration apparatus at a UE according to some embodiments.

Some embodiments provide a radio resource configuration apparatus configured in a UE. As shown in FIG. 3A, the radio resource configuration module includes: a first reception module 10, a first configuration module 20, and a response module 30.

The first reception module 10 is configured to receive a message of the radio resource configuration from an SRB of a first RAT. The message carries information of the second configuration, the second configuration is a configuration of a radio resource of the second RAT, and the first RAT is different from the second RAT.

The first configuration module 20 is configured to configure the radio resource of the second RAT according to the information of the second configuration.

The response module 30 is configured to: when the configuration of the radio resource of the second RAT is performed, send a response message of the radio resource configuration to indicate that the radio resource configuration of the second RAT fails.

In the above embodiment, an SRB of the first RAT is an SRB established between the UE and a first network element using the first RAT, and the second configuration is a configuration performed by a second network element using the second RAT for the UE. The first network element and the second network element simultaneously provide a communication service for the UE over the radio interface, and the first network element establishes an only control plane interface between the UE and a core network.

In some embodiments, the response message of the radio resource configuration sent by the first response module carries report information about failure of the radio resource configuration of the second RAT. The report information includes at least one of the following information: assistance information for assisting a network side in reconfiguring the radio resource of the second RAT; or indication information about the failure of the radio resource configuration of the second RAT.

In some embodiments, the assistance information includes at least one of the following information: a failure cause or a configuration part which is not able to be used in the second configuration. In some embodiments, the assistance information includes a measurement result of the UE on a radio channel of the second RAT, and at least one of the following the information: the failure cause or the configuration part which is not able to be used in the second configuration.

In some embodiments, the first response module codes the report information by using ASN.1 corresponding to the first RAT, sends the response message of the radio resource configuration through the SRB of the first RAT, and reports the report information to the first network element for processing. In other embodiments, the first response module codes the report information by using ASN.1 corresponding to the second RAT, sends the response message of the radio resource configuration through the SRB of the first RAT, carries the report information in a container of the response message, and forwards the container through the first network element to the second network element for processing.

Figure 3B:
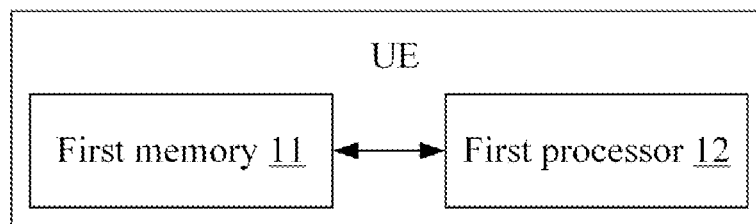
FIG. 3B is a structural diagram of a UE according to some embodiments.

Some embodiments provide a UE. As shown in FIG. 3B, the UE includes a first memory 11 and a first processor 12.

The first memory is configured to store program codes.

The first processor is configured to read the program codes for performing following processing.

A first message of radio resource configuration is received from an SRB of a first RAT. The first message carries information of second configuration, the second configuration is configuration of a radio resource of the second RAT, and the first RAT is different from the second RAT.

When the configuration of the radio resource of the first RAT performed according to the information of the first configuration fails, a response message of the radio resource configuration is sent to indicate that the radio resource configuration of the first RAT fails.

In some embodiments, the response message of the radio resource configuration sent by the first processor carries report information about failure of the radio resource configuration of the second RAT. The report information includes at least one of the following information: assistance information for assisting a network side in reconfiguring the radio resource of the second RAT; or indication information about the failure of the radio resource configuration of the second RAT.

In some embodiments, the assistance information includes at least one of the following information: a failure cause or a configuration part which is not able to be used in the second configuration. In some embodiments, the assistance information includes a measurement result of the UE on a radio channel of the second RAT, and at least one of the following the information: the failure cause or the configuration part which is not able to be used in the second configuration.

In some embodiments, the first processor codes the report information by using ASN.1 corresponding to the first RAT, sends the response message of the radio resource configuration through the SRB of the first RAT, and reports the report information to the first network element for processing. In other embodiments, the processor codes the report information by using ASN.1 corresponding to the second RAT, sends the response message of the radio resource configuration through the SRB of the first RAT, carries the report information in a container of the response message, and forwards the container through the first network element to the second network element for processing.

The above processor may perform any process in the method embodiments described above.

With the above solutions of the above embodiments, when the UE fails to configure the radio resource of the second RAT, the failure will be reported in time, and a resume procedure is not triggered, and the configuration of the radio resource of the first RAT is not affected, thereby avoiding interruption of data transmission of the user plane, reducing complexity of the UE executing the procedure, reducing signaling transmission load of the control plane, and improving the system performance.

Some embodiments relate to radio resource configuration at the UE side.

A system architecture on which these embodiments are based is basically the same as the system architecture in the above embodiments. The difference is that the SRB of the second RAT is established between the second network element and the UE, and that the UE receives information of the second configuration through the SRB of the second RAT.

Figure 4:
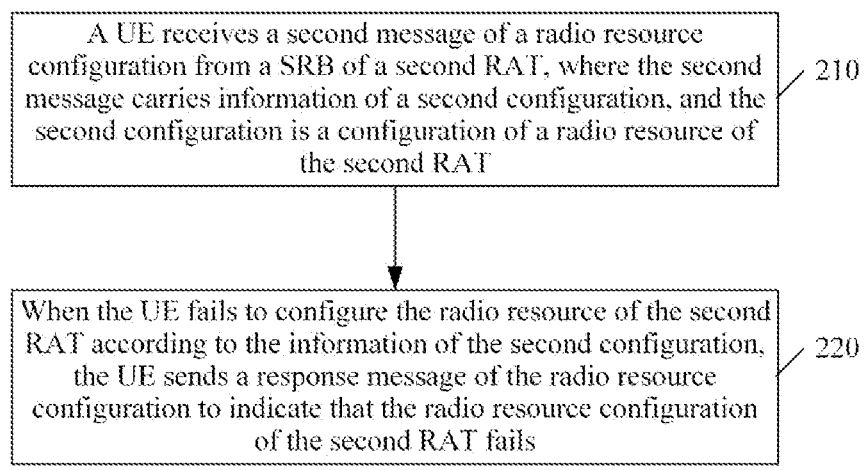
FIG. 4 is a flowchart of a radio resource configuration method at a UE side according to some embodiments.

Some embodiments provide a radio resource configuration method. As shown in FIG. 4, the method includes steps described below.

In a step 210, a UE receives a second message of radio resource configuration from an SRB of a second RAT. The second message carries information of second configuration, and the second configuration is a configuration of a radio resource of the second RAT.

In the method embodiment, the second configuration is a configuration performed by a second network element for the UE, the second network element and a first network element using a first RAT simultaneously provide a communication service for the UE over a radio interface, the first network element establishes an only control plane interface between the UE and a core network, and an SRB of the first RAT is established between the first network element and the UE.

In a step 220, when the UE fails to configure the radio resource of the second RAT according to the information of the second configuration, the UE sends a response message of the radio resource configuration to indicate that the radio resource configuration of the second RAT fails.

In some embodiments, report information about failure of the radio resource configuration of the second RAT carried in the response message of the radio resource configuration is the same as the report information in the above embodiment.

In some embodiments, the report information includes at least one of the following information: assistance information for assisting a network side in reconfiguring the radio resource of the second RAT; or indication information about the failure of the radio resource configuration of the second RAT.

In some embodiments, the assistance information includes at least one of the following information: a failure cause or a configuration part which is not able to be used in the second configuration.

In some embodiments, the assistance information includes a measurement result of the UE on a radio channel of the second RAT, and at least one of the following the information: the failure cause or the configuration part which is not able to be used in the second configuration.

In some embodiments, after the radio resource configuration of the second RAT fails, the UE sends the report information to the first network element, and a processing decision on the report information is made by the first network element. For example, the report information about failure of the radio resource configuration of the second RAT is coded by using ASN.1 corresponding to the first RAT. The UE sends the response message of the radio resource configuration through the SRB of the first RAT, and reports the report information to the first network element for processing.

In some embodiments, after the radio resource configuration of the second RAT fails, the UE sends the report information to the second network element, and the processing decision on the report information is made by the second network element. At this time, two different implementation modes exist: mode A and mode B.

In the implementation mode A, the report information about failure of the radio resource configuration of the second RAT is coded by using ASN.1 corresponding to the second RAT. The UE sends the response message of the radio resource configuration through the SRB of the first RAT, carries the report information in a container of the response message, and forwards the container through the first network element to the second network element for processing.

In an implementation mode B, the report information about failure of the radio resource configuration of the second RAT is coded by using ASN.1 corresponding to the second RAT. The UE sends the response message of the radio resource configuration through a common control channel (CCCH) of the second RAT, and reports the report information to the second network element for processing.

In some embodiments, when the radio resource configuration of the second RAT fails, the SRB of the second RAT established between the UE and the second network element cannot be used, and the SRB of the second RAT is born on a dedicated control channel (DCCH). The UE then sends the response message to the second network element through a CCCH between the UE and the second network element.

Some embodiments provide a radio resource configuration apparatus configured in a UE. Referring to FIG. 3, the radio resource configuration module includes: a first reception module 10, a first configuration module 20, and a response module 30.

The first reception module 10 is configured to receive a second message of the radio resource configuration from an SRB of a second RAT. The second message carries information of the second configuration, the second configuration is a configuration of a radio resource of the second RAT, and the first RAT is different from the second RAT.

The first configuration module 20 is configured to configure the radio resource of the second RAT according to the information of the second configuration.

The response module 30 is configured to: when the configuration of the radio resource of the second RAT is performed, send a response message of the radio resource configuration to indicate that the radio resource configuration of the second RAT fails.

In the above embodiment, the SRB of the second RAT is an SRB established between the UE and a second network element using the second RAT, and the second configuration is a configuration performed by the second network element for the UE. The second network element and a first network element using the first RAT simultaneously provide a communication service for the UE over a radio interface, the first network element establishes an only control plane interface between the UE and a core network, and an SRB of the first RAT is established between the first network element and the UE.

In some embodiments, the response message of the radio resource configuration sent by the response module 30 carries report information about the failure of the radio resource configuration of the second RAT. The report information includes at least one of the following information: assistance information for assisting a network side in reconfiguring the radio resource of the second RAT; or indication information about the failure of the radio resource configuration of the second RAT.

In some embodiments, the assistance information includes at least one of the following information: a failure cause or a configuration part which is not able to be used in the second configuration.

In some embodiments, the assistance information includes a measurement result of the UE on a radio channel of the second RAT, and at least one of the following the information: the failure cause or the configuration part which is not able to be used in the second configuration.

In some embodiments, the response module 30 codes the report information by using ASN.1 corresponding to the first RAT, sends the response message of the radio resource configuration through the SRB of the first RAT, and reports the report information to the first network element for processing.

In other embodiments, the response module 30 codes the report information by using ASN.1 corresponding to the second RAT, sends the response message of the radio resource configuration through the SRB of the first RAT, carries the report information in a container of the response message, and forwards the container through the first network element to the second network element for processing.

In another embodiment, the response module 30 codes the report information by using ASN.1 corresponding to the second RAT, sends the response message of the radio resource configuration through a CCCH of the second RAT, and reports the report information to the second network element for processing.

Some embodiments provide a UE which includes a first memory and a first processor.

The first memory is configured to store program codes.

The first processor is configured to read the program codes for performing the following processing.

A second message of radio resource configuration is received from an SRB of a second RAT. The second message carries information of the second configuration, the second configuration is a configuration of a radio resource of the second RAT, and the first RAT is different from the second RAT.

When the radio resource configuration of the second RAT performed according to the information of the second configuration fails, a response message of the radio resource configuration is sent to indicate that the radio resource configuration of the second RAT fails.

In some embodiments, the response message of the radio resource configuration sent by the first processor carries report information about failure of the radio resource configuration of the second RAT. The report information includes at least one of the following information: assistance information for assisting a network side in reconfiguring the radio resource of the second RAT; or indication information about the failure of the radio resource configuration of the second RAT.

In some embodiments, the assistance information includes at least one of the following information: a failure cause or a configuration part which is not able to be used in the second configuration.

In some embodiments, the assistance information includes a measurement result of the UE on a radio channel of the second RAT, and at least one of the following the information: the failure cause or the configuration part which is not able to be used in the second configuration.

In some embodiments, the first processor codes the report information by using ASN.1 corresponding to the first RAT, sends the response message of the radio resource configuration through the SRB of the first RAT, and reports the report information to the first network element for processing.

In another embodiment, the first processor codes the report information by using ASN.1 corresponding to the second RAT, sends the response message of the radio resource configuration through the SRB of the first RAT, carries the report information in a container of the response message, and forwards the container through the first network element to the second network element for processing.

In another embodiment, the first processor codes the report information by using ASN.1 corresponding to the second RAT, sends the response message of the radio resource configuration through a CCCH of the second RAT, and reports the report information to the second network element for processing.

The above processor may perform any processing in the method of the above embodiments.

With the above solutions of the above embodiments, when the UE fails to configure the radio resource of the second RAT, the failure will be reported in time, and a resume procedure is not triggered, and the radio resource configuration of the first RAT is not affected, thereby avoiding interruption of data transmission of the user plane, reducing complexity of the UE executing the procedure, reducing signaling transmission load of the control plane, and improving the system performance.

Some embodiments relate to radio resource configuration at the first network element side, and the system architecture on which these embodiments are based is the same as the system architecture in the above embodiment.

Figure 5:
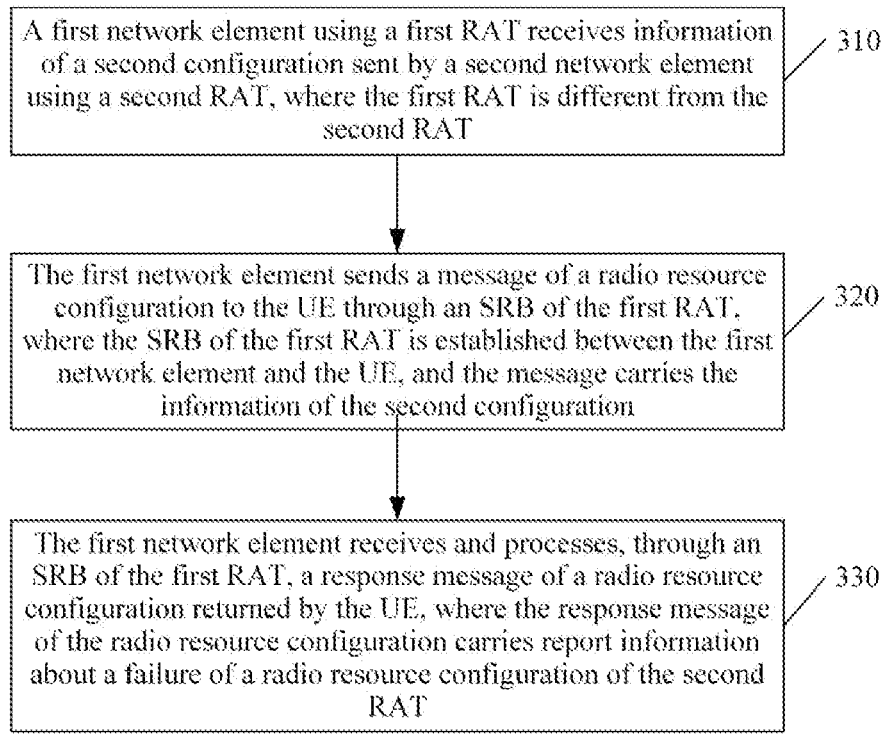
FIG. 5 is a flowchart of a radio resource configuration method at a first network element side according to some embodiments.

A radio resource configuration method in these embodiments is shown in FIG. 5. The method includes steps described below.

In a step 310, a first network element using a first RAT receives information of second configuration sent by a second network element using a second RAT. The first RAT is different from the second RAT.

In some embodiments, the information of the second configuration is sent by the second network element to the first network element via an interface between the network elements.

In a step 320, the first network element sends a message of the radio resource configuration to the UE through an SRB of the first RAT, where the SRB of the first RAT is established between the first network element and the UE. The message carries the information of the second configuration.

In some embodiments, when the first network element sends a message to the UE by using the SRB of the first RAT, the SRB of the first RAT is configured as a bearer type of a master cell group (MCG). In some embodiments, when the first network element sends the message to the UE by using the SRB of the first RAT, the SRB of the first RAT is configured as a bearer type of MCG split. In some embodiments, when the SRB of the first RAT is configured as the bearer type of the MCG split, the first network element takes an SRB established between the second network element and the UE as one branch of the SRB of the first RAT to transmit data.

In some embodiments, the message of the radio resource configuration adopts RRC signaling, the message further includes information of the first configuration, and the first configuration is a configuration of a radio resource of the first RAT performed by the first element for the UE.

In a step 330, the first network element receives and processes, through an SRB of the first RAT, a response message of radio resource configuration returned by the UE. The response message of the radio resource configuration carries report information about failure of radio resource configuration of the second RAT.

The second configuration is a configuration of the radio resource of the second RAT performed by the second network element for the UE. The first network element and the second network element simultaneously provide a communication service for the UE over a radio interface, and the first network element establishes an only control plane interface between the UE and a core network.

In some embodiments, the report information about the failure of the radio resource configuration of the second RAT includes at least one of the following information: indication information about the failure of the radio resource configuration of the second RAT; or assistance information for assisting a network side in reconfiguring the radio resource of the second RAT.

In some embodiments, the assistance information includes at least one of the following information: a failure cause or a configuration part which is not able to be used in the second configuration.

In some embodiments, the assistance information includes a measurement result of the UE on a radio channel of the second RAT, and at least one of the following the information: the failure cause or the configuration part which is not able to be used in the second configuration.

In some embodiments, the message of the radio resource configuration includes information of the first configuration, and when the UE successfully configures the radio resource of the first RAT, the response message of the radio resource configuration further carries indication information indicating that the radio resource configuration of the first RAT is successful.

In some embodiments, the report information is coded by using ASN.1 corresponding to the first RAT. The step in which the first network element receives and processes the response message of the radio resource configuration returned by the UE includes that: the first network element decodes the report information, and performs a radio resource management decision according to the report information.

In another embodiment, the report information is coded by using ASN.1 corresponding to the second RAT and the coded report information is carried in a container of the response message. The step in which the first network element receives and processes the response message of the radio resource configuration returned by the UE includes that: the first network element forwards the container in the response message to the second network element, and after decoding the report information in the container, the second network element performs the radio resource management decision according to the report information.

In some embodiments, a result of the radio resource management decision is to release the second network element, or switch the second network element, or reconfigure the radio resource of the second RAT by the second network element. The switching of the second network element refers to switching the second network element (source second network element) currently serving the UE to another new second network element (the target second network element, also referred to as the switched second network element).

In some embodiments, when the first network element performs the radio resource management decision according to the report information, if the assistance information does not include a measurement result, the decision is performed according to the measurement result obtained in the measurement report message received by the first network element from the UE last time. In some embodiments, when the second network element performs the radio resource management decision according to the report information, if the assistance information does not include a measurement result, the decision is performed according to the measurement result obtained in the measurement report message received by the second network element from the UE last time.

In some embodiments, when the result of the radio resource management decision is to release the second network element, the method further includes that: the first network element notifies, through the SRB of the first RAT, the UE to release the radio resource of the second RAT.

In some embodiments, when the result of the radio resource management decision is to switch the second network element, the method further includes that: the first network element receives information of radio resource reconfiguration of a second RAT sent by the switched second network element, and sends, through the SRB of the first RAT, the information to the UE.

In some embodiments, when the result of the radio resource management decision is to reconfigure the radio resource of the second RAT by the second network element, the method further includes that: the first network element receives information of radio resource reconfiguration of the second RAT sent by the second network element, and sends, through the SRB of the first RAT, the information to the UE.

Figure 6A:
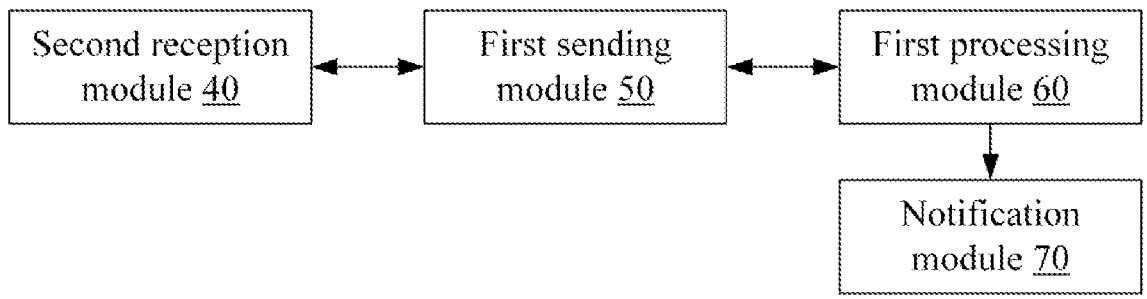
FIG. 6A is a diagram of modules of a radio resource configuration apparatus in a first network element according to some embodiments.
Figure 6B:
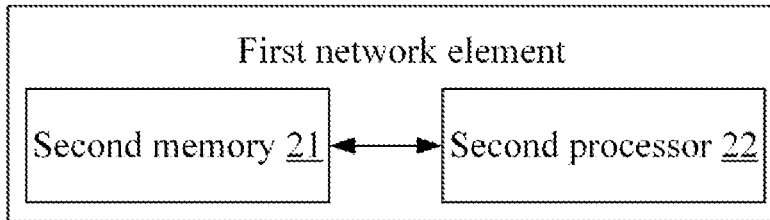
FIG. 6B is a structural diagram of a first network element according to some embodiments.

Some embodiments provide a radio resource configuration apparatus configured in a first network element using a first RAT. As shown in FIG. 6, the radio resource configuration module includes: a second reception module 40, a first sending module 50 and a first processing module 60.

The second reception module 40 is configured to receive information of the second configuration sent by a second network element using a second RAT. The first RAT is different from the second RAT.

The first sending module 50 is configured to send a message of radio resource configuration to the UE through an SRB of the first RAT, where the SRB of the first RAT is established between the first sending module 50 and the UE, and the message carries the information of the second configuration.

The first processing module 60 is configured to receive and process, through the SRB of the first RAT, a response message of the radio resource configuration returned by the UE. The response message of the radio resource configuration carries report information about failure of radio resource configuration of the second RAT.

The second configuration is configuration of the radio resource of the second RAT performed by the second network element for the UE. The first network element and the second network element simultaneously provide a communication service for the UE over a radio interface, and the first network element establishes an only control plane interface between the UE and a core network.

In some embodiments, the report information is coded by using ASN.1 corresponding to the first RAT. The step in which the first processing module 60 receives and processes the response message of the radio resource configuration returned by the UE includes: decoding the report information, and performing a radio resource management decision according to the report information.

In another embodiment, the report information is coded by using ASN.1 corresponding to the second RAT and is carried in a container of the response message; and the step in which the first processing module 60 receives and processes the response message of the radio resource configuration returned by the UE includes: forwarding the container in the response message to the second network element, and after decoding the report information in the container, the second network element performs the radio resource management decision according to the report information.

In some embodiments, a result of the radio resource management decision is to release the second network element, or switch the second network element, or reconfigure the radio resource of the second RAT by the second network element.

In some embodiments, the apparatus further includes: a notification module 70. The notification module 70 is configured to: when the result of the radio resource management decision is to release the second network element, notify, through the SRB of the first RAT, the UE to release the radio resource of the second RAT; when the result of the radio resource management decision is to switch the second network element, receive information of radio resource reconfiguration of a second RAT sent by the switched second network element, and send, through the SRB of the first RAT, the information to the UE; and when the result of the radio resource management decision is to reconfigure the radio resource of the second RAT by the second network element, receive information of radio resource reconfiguration of the second RAT sent by the second network element, and send, through the SRB of the first RAT, the information to the UE.

Some embodiments provide a first network element including a second memory 21 and a second processor 22.

The second memory 21 is configured to store program codes.

The second processor 22 is configured to read the program codes for performing following processing.

Information of second configuration sent by a second network element using a second RAT is received, where the first RAT is different from the second RAT.

A message of radio resource configuration is sent to the UE through an SRB of the first RAT, where the SRB of the first RAT is established between the first network element and the UE, and the information of the second configuration is carried in the message.

A response message of the radio resource configuration returned by the UE is received and processed through the SRB of the first RAT. The response message of the radio resource configuration carries report information about failure of radio resource configuration of the second RAT.

The second configuration is a configuration of the radio resource of the second RAT performed by the second network element for the UE. The first network element using the first RAT and the second network element simultaneously provide a communication service for the UE over a radio interface, and the first network element establishes an only control plane interface between the UE and a core network.

In some embodiments, the report information is coded by using ASN.1 corresponding to the first RAT. The step in which the processor receives and processes the response message of the radio resource configuration returned by the UE includes: decoding the report information, and performing a radio resource management decision according to the report information.

In another embodiment, the report information is coded by using ASN.1 corresponding to the second RAT and is carried in a container of the response message; and the step in which the second processor receives and processes the response message of the radio resource configuration returned by the UE includes: forwarding the container in the response message to the second network element, and after decoding the report information in the container, the second network element performs the radio resource management decision according to the report information.

With the above solution, when the UE fails to configure the radio resource of the second RAT, the first network element receives and processes the report information in time, and the radio resource configuration of the first RAT is not affected, so as to avoid interruption of data transmission of the user plane, reduce signaling transmission load of the control plane, and improve the system performance.

Some embodiments relate to radio resource configuration on a second network element side.

A system architecture on which these embodiments are based is the same as the system architecture in the above embodiments. The difference is that the SRB of the second RAT is established between the second network element and the UE, and that the second network element sends information of the second configuration to the UE through the SRB of the second RAT.

Figure 7:
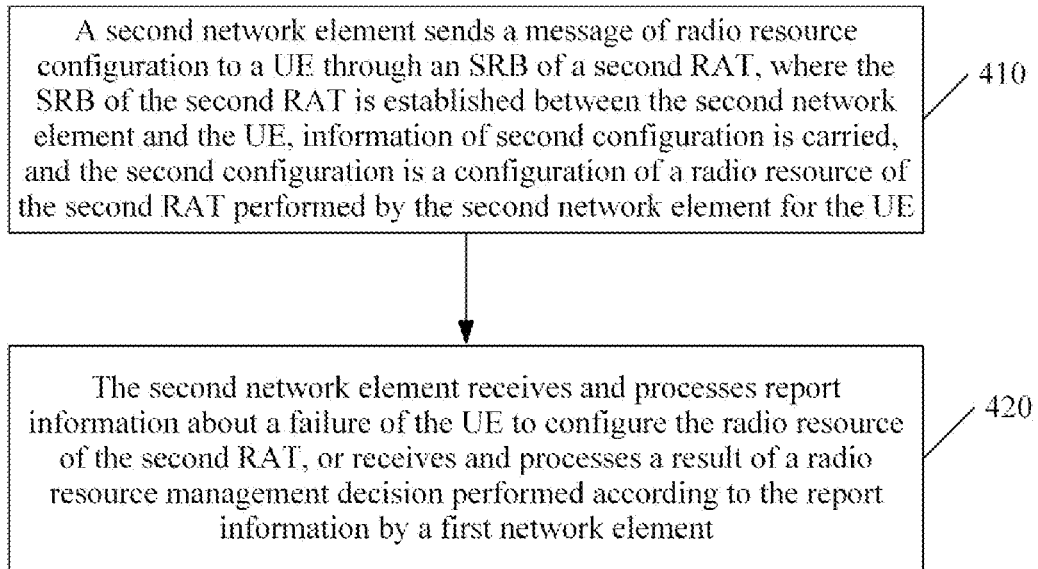
FIG. 7 is a flowchart of a radio resource configuration method at a second network element side according to some embodiments.

Some embodiments provide a radio resource configuration method. As shown in FIG. 7, the method includes steps described below.

In a step 410, a second network element sends a message of radio resource configuration to a UE through an SRB of a second RAT, where the SRB of the second RAT is established between the second network element and the UE, information of second configuration is carried in the message, and the second configuration is a configuration of a radio resource of the second RAT performed by the second network element for the UE.

In some embodiments, information of the first configuration is not carried in the message of the radio resource configuration sent by the second network element to the UE.

In a step 420, the second network element receives and processes report information about failure of the radio resource configuration of the second RAT from the UE, or receives and processes a result of a radio resource management decision, where the decision is performed according to the report information by a first network element.

The second network element using the second RAT and the first network element using a first RAT simultaneously provide a communication service for the UE over a radio interface, and the first network element establishes an only control plane interface between the UE and a core network.

In some embodiments, the step in which the second network element receives and processes the report information about failure of the radio resource configuration of the second RAT from the UE includes that: the second network element receives, through a CCCH of the second RAT, a response message of the radio resource configuration returned by the UE, decodes the report information about failure of the radio resource configuration of the second RAT carried in the response message, and performs the radio resource management decision according to the report information. The report information is coded by using ASN.1 corresponding to the second RAT.

In another embodiment, the step in which the second network element receives and processes the report information about failure of the radio resource configuration of the second RAT from the UE includes that: the second network element receives the report information about failure of the radio resource configuration of the second RAT, where the report information is forwarded by the first network element through a container, decodes the report information, and then performs a radio resource management decision according to the report information. The report information is coded by using ASN.1 corresponding to the second RAT.

In some embodiments, the second network element receives and processes the result of the radio resource management decision, where the decision is performed by the first network element according to the report information. The radio resource management decision is initiated after the first network element receives and decodes the report information about failure of the radio resource configuration of the second RAT sent by the UE, and the report information is coded by using ASN.1 corresponding to the first RAT.

In some embodiments, the result of the radio resource management decision is to release the second network element, or switch the second network element, or reconfigure the radio resource of the second RAT by the second network element.

In some embodiments, when the result of the radio resource management decision is to reconfigure the radio resource of the second RAT by the second network element, the method further includes that: the second network element performs radio resource reconfiguration of the second RAT, sends information of the radio resource reconfiguration of the second RAT to the UE through a CCCH of the second RAT, or forwards the information of the radio resource reconfiguration of the second RAT to the UE through the first network element.

In some embodiments, if the result of the radio resource management decision is to release the second network element, a decision maker notifies the UE of releasing the radio resource of the second RAT. In some embodiments, if the result of the radio resource management decision is to switch the second network element, the switched second network element sends information of the radio resource reconfiguration of the second RAT to the UE directly or through the first network element.

In some embodiments, the report information includes at least one of the following information: indication information about the failure of the radio resource configuration of the second RAT; or assistance information for assisting a network side in reconfiguring the radio resource of the second RAT.

In some embodiments, the assistance information includes at least one of the following information: a failure cause or a configuration part which is not able to be used in the second configuration.

In some embodiments, the assistance information includes a measurement result of the UE on a radio channel of the second RAT, and at least one of the following the information: the failure cause or the configuration part which is not able to be used in the second configuration.

Figure 8A:
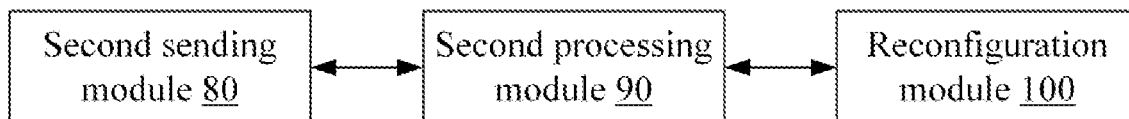
FIG. 8A is a diagram of modules of a radio resource configuration apparatus in a second network element according to some embodiments.
Figure 8B:
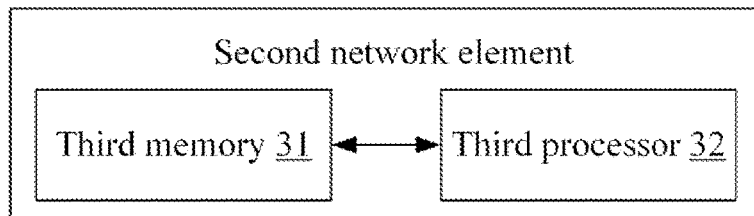
FIG. 8B is a structural diagram of a second network element according to some embodiments.

Some embodiments provide a radio resource configuration apparatus configured in a second network element using a second RAT. As shown in FIG. 8, the radio resource configuration module includes: a second sending module 80 and a second processing module 90.

The second sending module 80 is configured to send a message of radio resource configuration to a UE through an SRB of a second RAT, where the SRB of the second RAT is established between the second network element and the UE, information of second configuration is carried in the message, and the second configuration is a configuration of a radio resource of the second RAT performed by the second network element for the UE.

The second processing module 90 is configured to receive and process report information about failure of the radio resource configuration of the second RAT from the UE, or receive and process a result of a radio resource management decision performed according to the report information by a first network element.

The second network element using the second RAT and the first network element using a first RAT simultaneously provide a communication service for the UE over a radio interface, and the first network element establishes an only control plane interface between the UE and a core network.

In some embodiments, the step in which the second processing module 90 receives and processes the report information about failure of the radio resource configuration of the second RAT from the UE includes: receiving, through a CCCH of the second RAT, a response message of the radio resource configuration returned by the UE, decoding the report information about failure of the radio resource configuration of the second RAT carried in the response message, and performing the radio resource management decision according to the report information. The report information is coded by using ASN.1 corresponding to the second RAT.

In another embodiment, the step in which the second processing module 90 receives and processes the report information about failure of the radio resource configuration of the second RAT from the UE includes: receiving the report information about failure of the radio resource configuration of the second RAT, where the report information is forwarded by the first network element, decoding the report information, and then performing a radio resource management decision according to the report information. The report information is coded by using ASN.1 corresponding to the second RAT.

In some embodiments, a result of the radio resource management decision is to release the second network element, or switch the second network element, or reconfigure the radio resource of the second RAT by the second network element.

In some embodiments, the apparatus further includes: a reconfiguration module 100. The reconfiguration module 100 is configured to: when the result of the radio resource management decision is to reconfigure the radio resource of the second RAT by the second network element, perform radio resource reconfiguration of the second RAT, send information of the radio resource reconfiguration of the second RAT to the UE through a CCCH of the second RAT, or forward the information of the radio resource reconfiguration of the second RAT to the UE through the first network element.

Some embodiments provide a second network element including a third memory 31 and a third processor 32.

The third memory 31 is configured to store program codes.

The third processor 32 is configured to read the program codes for performing following processing.

A message of radio resource configuration is sent to a UE through an SRB of a second RAT, where the message is established between the second network element and the UE, the information of second configuration is carried in the message, and the second configuration is a configuration of a radio resource of the second RAT performed by the second network element for the UE.

Report information about failure of the radio resource of the second RAT is received from the UE and is processed, or a result of a radio resource management decision performed according to the report information by a first network element is received and processed.

The second network element using the second RAT and the first network element using a first RAT simultaneously provide a communication service for the UE over a radio interface, and the first network element establishes an only control plane interface between the UE and a core network.

In some embodiments, the step in which the third processor receives and processes the report information about failure of the radio resource configuration of the second RAT from the UE includes: receiving, through a CCCH of the second RAT, a response message of the radio resource configuration returned by the UE, decoding the report information about failure of the radio resource configuration of the second RAT carried in the response message, and performing the radio resource management decision according to the report information. The report information is coded by using ASN.1 corresponding to the second RAT.

In another embodiment, the step in which the third processor receives and processes the report information about failure of the radio resource configuration of the second RAT from the UE includes: receiving the report information about failure of the radio resource configuration of the second RAT, where the report information is forwarded by the first network element, decoding the report information, and then performing a radio resource management decision according to the report information. The report information is coded by using ASN.1 corresponding to the second RAT.

With the above solution, when the UE fails to configure the radio resource of the second RAT, the second network element receives and processes the report information or the decision result in time and performs corresponding processing, so as to avoid interruption of data transmission of the user plane, reduce signaling transmission load of the control plane, and improve the system performance.

A signaling flow of radio resource configuration is described in the embodiments described below.

In some embodiments, a first network element using a first RAT and a second network element using a second RAT over a radio interface provide a communication service for a UE in a manner of tight coupling and interoperation. The first network element establishes a control plane interface between the UE and a core network. An SRB (first SRB) is established between the UE and the first network element over the radio interface to perform transmission of control plane signaling. In some embodiments, data transmission of the user plane is further performed between the UE and the first network element, and only data transmission of the user plane is performed between the UE and the second network element.

Figure 9:
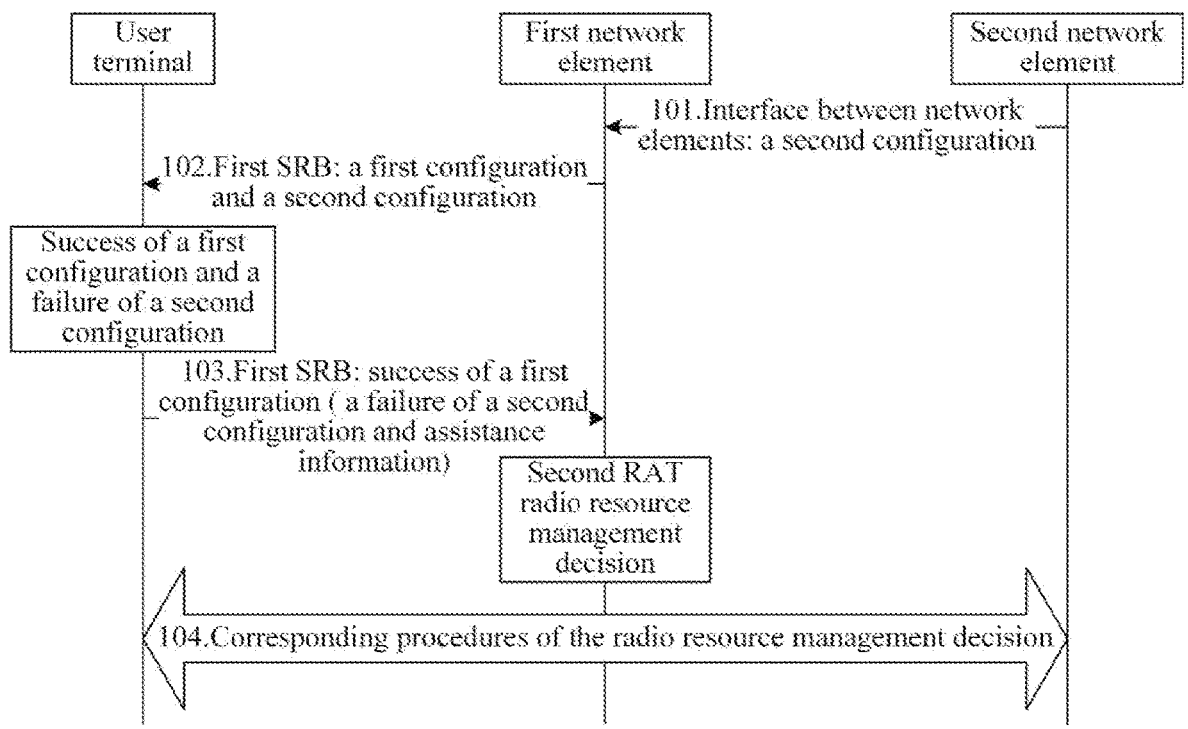
FIG. 9 is a signaling flow diagram of radio resource configuration according to some embodiments.

The flow of a radio resource configuration method in some embodiments is as shown in FIG. 9. The method includes steps described below.

In a step 101, according to a configuration requirement of a radio resource, a second network element sends the second configuration to a first network element via an interface between network elements when the second network element performs the second configuration on the radio resource of the second RAT used by the UE. The second configuration is coded by using ASN.1 corresponding to the second RAT, and may be carried in a container of a message of the interface between the network elements. In some embodiments, the configuration requirement of the radio resource is made by the second network element according to a radio resource management decision of the second network element itself. In some embodiments, the configuration requirement of the radio resource is made according to a request message received from the first network element.

In a step 102, after receiving the second configuration, the first network element generates a corresponding RRC signaling, such as an RRC connection reconfiguration message. In some embodiments, the RRC connection reconfiguration message includes a first configuration performed by the first network element on a radio resource of the first RAT used by the UE. In some embodiments, the first configuration coded by using ASN.1 corresponding to the first RAT is relatively independent of the second configuration. In some embodiments, the first configuration coded by using the ASN.1 corresponding to the first RAT has a correlation with the second configuration. The first network element sends the RRC connection reconfiguration message to the UE through a first SRB.

In a step 103, after the UE receives the RRC connection reconfiguration message, the UE performs radio resource configuration of the first RAT and radio resource configuration of the second RAT respectively according to the first configuration and the second configuration carried in the message. If the UE successfully configures the radio resource of the first RAT and fails to configure the radio resource of the second RAT, the UE indicates at least information that the UE successfully configures the radio resource of the first RAT in RRC signaling (such as the RRC connection reconfiguration complete message), where the RRC signaling is replied to the first network element. The information is coded by using first ASN.1.

In some embodiments, the RRC connection reconfiguration complete message further carries information indicating that the UE fails to configure the radio resource of the second RAT.

In some embodiments, the RRC connection reconfiguration complete message further carries assistance information. The assistance information includes at least one of: the reason why the UE failed to configure the radio resource of the second RAT; the radio resource that cannot be configured; or the radio resources that cannot be configured.

In some embodiments, the assistance information further includes a result obtained by the UE performing measurement according to measurement configuration of the second RAT performed by the first network element.

Indication information indicating that the UE fails to configure the radio resource of the second RAT and the assistance information are coded by using the first ASN.1.

In some embodiments, the indication information indicating that the UE fails to configure the radio resource of the second RAT and the assistance information are only carried in a message for SCG failure information. In some embodiments, the indication information and the assistance information are only carried in an RRC message sent by the UE to a base station, such as an RRC message (e.g., an RRC connection resume message) in 3GPP TS 38.331 V15.0.0 (2017-12) sent by the UE to the base station.

In a step 104, after the first network element receives the indication information indicating that the UE fails to configure the radio resource of the second RAT, the first network element performs a radio resource management decision. A result of the decision is to release the second network element, or switch the second network element from a source second RAT node to a target node, or notify the second network element of performing radio resource reconfiguration of the second RAT. In some embodiments, a procedure for releasing the second network element or switching the second network element is with reference to the standard 3GPP TS 37.340.

In some embodiments, when the assistance information is included in the RRC signaling replied by the UE, the first network element performs a decision with reference to the assistance information; and if the measurement result is not included in the assistance information, the first network element performs a decision with reference to the measurement result last received from the UE. In some embodiments, in the procedure that the first network element notifies the second network element to perform the radio resource reconfiguration of the second RAT, the first network element sends the assistance information to the second network element.

Figure 10:
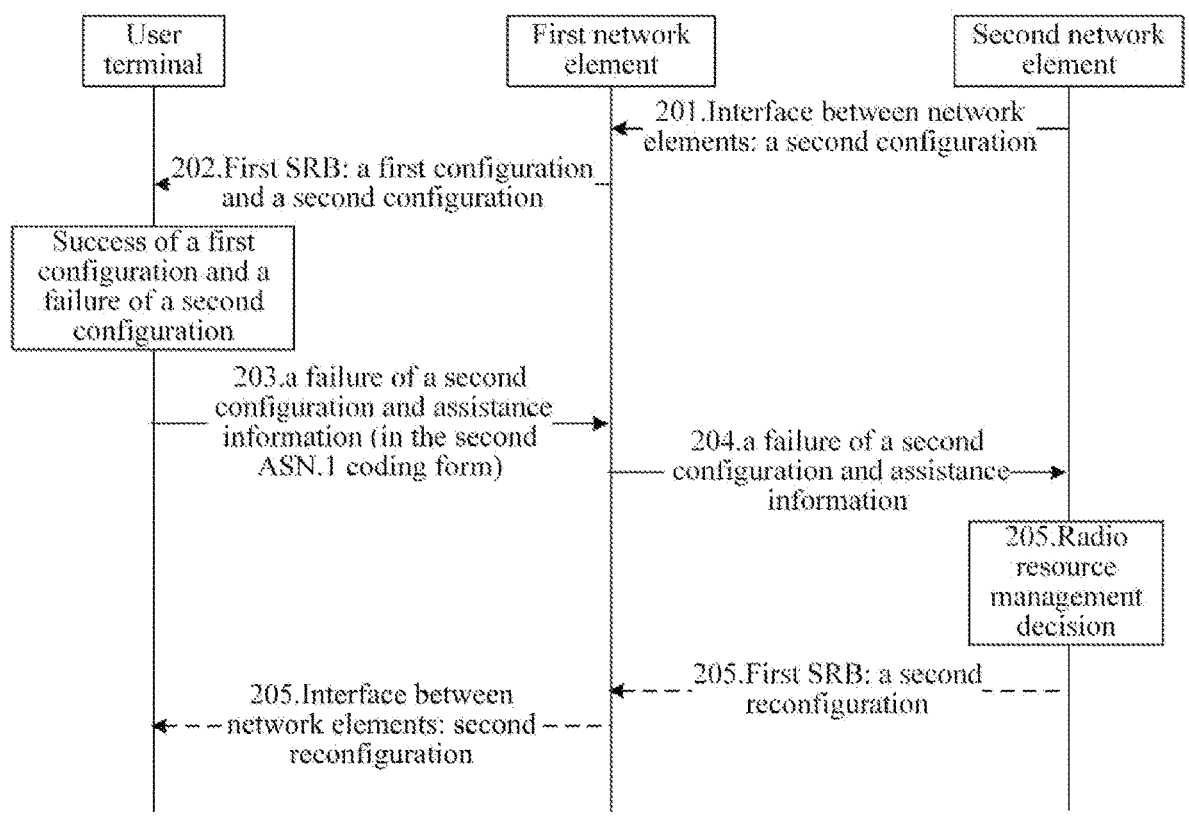
FIG. 10 is a signaling flow diagram of radio resource configuration according to some embodiments.

The system architecture on which some embodiments are based is the same as the system architecture of the embodiment where FIG. 9 is located. A radio resource configuration method in the embodiment is as shown in FIG. 10, and the method includes the steps described below.

Steps 201 and 202 are the same as steps 101 and 102 in the above embodiment, sending of RRC signaling by the first network element, and reception and configuration performed by the UE are as illustrated in the embodiment of FIG. 9.

In a step 203, the UE codes the indication information, indicating that the UE fails to configure the radio resource of the second RAT, and the assistance information in the response message by using the second ASN.1. In some embodiments, the indication information and the assistance information coded by using the second ASN.1 are carried in a container in RRC signaling replied by the UE to the first network element, where the indication information indicates that the UE fails to configure the radio resource of the second RAT.

In some embodiments, if a measurement result is included in the assistance information, the measurement result is a result obtained by the UE performing measurement according to measurement configuration of the second network element.

In a step 204, after the first network element receives the RRC signaling from the UE, the first network element does not interpret and make a corresponding decision on a container related to the second RAT and carried in the signaling, but transmits the container to the second network element via an interface between network elements.

In a step 205, after the second network element receives the container, the second network element performs a radio resource management decision related to the second RAT according to information indicated in the container. In some embodiments, the radio resource management decision is to release the second network element. In some embodiments, the radio resource management decision is to switch to a target second RAT node. In some embodiments, the radio resource management decision is to reconfigure the radio resource of the second RAT. In some embodiments, a procedure for releasing the second network element or switching the second network element triggered by the second network element is with reference to the standard 3GPP TS 37.340.

In some embodiments, if the assistance information is included in the container, the second network element makes a decision with reference to the assistance information; and if the measurement result is not included in the assistance information, the second network element makes a decision with reference to a measurement result obtained last time.

In some embodiments, when a result of the radio resource management decision of the second network element is to reconfigure the radio resource of the second RAT, the second network element sends reconfiguration (referred to as second reconfiguration) of the radio resource of the second RAT used by the UE to the first network element via the interface between network elements, and corresponding RRC signaling is generated by the first network element and is sent to the UE through the first SRB. In some embodiments, if the first SRB is configured as a bearer type of MCG split, the RRC signaling is born on a MCG split (split SRB) to be sent to the UE.

In some embodiments, a first network element using a first RAT and a second network element using a second RAT over a radio interface provide a communication service for a UE in a manner of tight coupling and interoperation. The first network element establishes a control plane interface between the UE and a core network. SRBs (a first SRB and a second SRB) are respectively established between the UE and the first network element and between the UE and the second network element over the radio interface to perform transmission of control plane signaling. Meanwhile, data transmission of the user plane is performed between the UE and the first network element and between the UE and the second network element.

Figure 11:
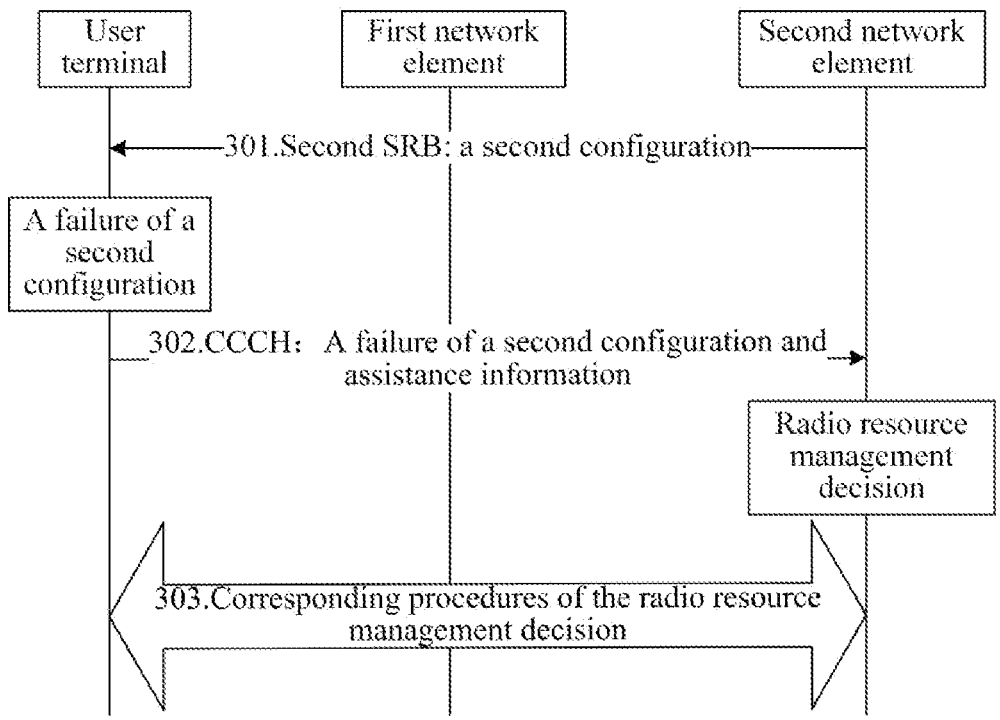
FIG. 11 is a signaling flow diagram of radio resource configuration according to some embodiments.

The flow of a radio resource configuration method in some embodiments is as shown in FIG. 11. The method includes steps described below.

In a step 301, according to a configuration requirement of the radio resource, when the second network element performs a second configuration on the radio resource of the second RAT used by the UE, corresponding RRC signaling (such as an RRC connection reconfiguration message) for the second configuration is generated by the second network element, and is sent to the UE through the second SRB. The second configuration is coded by using the second ASN.1, and has no immediate impact on the radio resource of the first RAT used by the UE.

In a step 302, after the UE receives the RRC connection reconfiguration message, the UE performs configuration on the radio resource of the second RAT according to the second configuration carried in the message. If the UE fails to perform the configuration, the UE replies a control plane message to the second network element. The control plane message carries information indicating that the UE fails to perform the second configuration.

In some embodiments, the control plane message further carries assistance information. The assistance information includes at least one of: the reason why the UE failed to perform the second configuration, which one of the second configurations that cannot be performed; or which part of the second configuration that cannot be performed. In some embodiments, the assistance information further includes a result obtained by the UE performing measurement according to the measurement configuration of the second network element.

Indication information, indicating that the UE fails to perform the second configuration, and the assistance information are coded by using the second ASN.1.

In some embodiments, the control plane message is an RRC connection reconfiguration complete message, or a message for SCG failure information, or other RRC signaling. In some embodiments, the other RRC signaling is RRC signaling sent by the UE to the base station, such as RRC signaling (e.g., RRC connection resume signaling) in 3GPP TS 38.331 V15.0.0 (2017-12) sent by the UE to the base station.

The control plane message is reported to the second network element through a CCCH of the second RAT.

In some embodiments, the control plane message is reported to the first network element through the first SRB, and then forwarded by the first network element to the second network element through a message of the interface between the network elements. In the transmission path, the indication information indicating that the UE fails to perform the second configuration and the assistance information are carried in the control plane message and the container of the message of the interface between the network elements.

In a step 303, after the second network element receives the indication information indicating that the UE fails to perform the second configuration, the second network element performs a radio resource management decision related to the second RAT. The decision result and the basis are the same as those described in the step 203.

Figure 12:
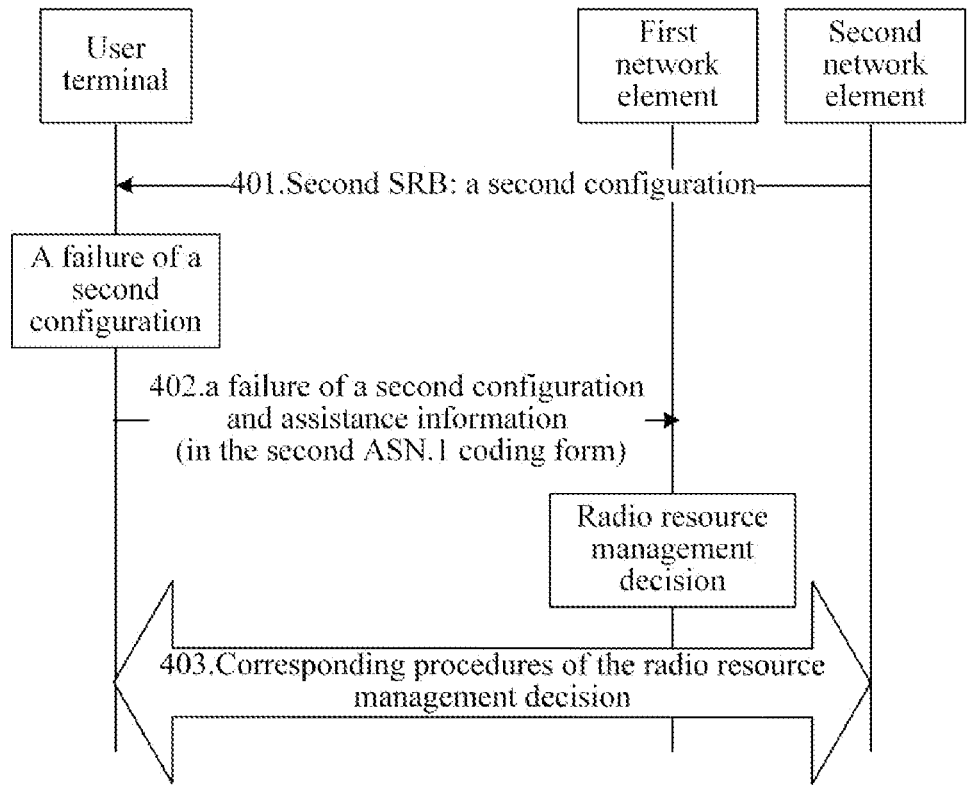
FIG. 12 is a signaling flow diagram of radio resource configuration according to some embodiments.

The system architecture on which some embodiments are based is the same as the system architecture of the embodiment where FIG. 11 is located. The flow of a method in these embodiments is as shown in FIG. 12, and the method includes steps described below.

The step 401 is the same as the step 301.

In a step 402, the coding form of the indication information indicating that the UE fails to perform the second configuration and the assistance information is performed by the UE, and the indication information indicating that the UE fails to perform the second configuration and the assistance information are coded by using the first ASN.1. The UE reports the control plane message to the first network element through the first SRB.

In a step 403, the radio resource management decision made by the first network element after the control plane message is received is the same as the decision described in the step 104.

In the system architecture of the above embodiment, and when the UE cannot receive the second radio resource configuration corresponding to the second network element, the influence on the first radio resource configuration corresponding to the first network element and the procedures such as reestablishment of the radio interface are avoided through the above solution, thereby avoiding interruption of data transmission of the user plane, reducing complexity of the UE executing the procedure, reducing signaling transmission load of the control plane, and improving the system performance.

In some embodiments, all or part of the steps of the method, and functional modules or units in the system and apparatus disclosed above are implemented as software, firmware, hardware and appropriate combinations thereof. In the hardware implementation, the division of functional modules or units mentioned in the above description may not correspond to the division of physical components. For example, one physical component may have multiple functions, or one function or step may be executed jointly by one or more physical components. In some embodiments, some or all components are implemented as software executed by processors such as central processing units, digital signal processors or microcontrollers, hardware, or integrated circuits such as application specific integrated circuits.

In some embodiments, the above software is distributed on a computer-readable medium, which may include a computer storage medium (or a non-transitory medium) and a communication medium (or a transitory medium). The computer storage medium includes volatile and nonvolatile, removable and non-removable media implemented in any method or technology for storage of information (such as computer-readable instructions, data structures or program modules).

The computer-storage medium includes, but is not limited to, a random-access memory (RAM), a read-only memory (ROM), an electrically erasable programmable read only memory (EEPROM), a flash memory, or other memory technologies, a compact disc read-only memory (CD-ROM), a digital video disc (DVD) or other optical disc storage, a magnetic cassette, a magnetic tape, disk storage or other magnetic storage apparatuses, or any other medium used to store the desired information and accessible by a computer. The communication medium generally includes computer-readable instructions, data structures, program modules or other data in a modulated data signal such as a carrier or other transport mechanisms. In some embodiments, the communication medium includes any information delivery medium.

INDUSTRIAL APPLICABILITY

The radio resource configuration method and apparatus, the user equipment and the network element avoid the phenomenon of data transmission interruption of a user plane and improve the system performance.

What is claimed is:

1. A radio resource configuration method, comprising:
    receiving, by a first network element using a first radio access technology (RAT) and through a signaling radio bearer (SRB) of the first RAT, a response message returned by a user equipment (UE), the SRB established between the first network element and the UE, wherein the response message carries report information about failure of a radio resource configuration of a second RAT; and
    processing, by the first network element, the response message,
    wherein the first network element and a second network element using the second RAT simultaneously provide a communication service for the UE over a radio interface, the first network element establishes an only control plane interface between the UE and a core network, and the first RAT is different from the second RAT.

2. The method of claim 1, wherein the report information comprises at least one of:
    indication information about the failure of the radio resource configuration of the second RAT; or
    assistance information for assisting a network side in reconfiguring a radio resource of the second RAT.

3. The method of claim 2, wherein
the assistance information comprises at least one of following information: a failure cause or a configuration part which is not able to be used in second configuration; or
the assistance information comprises a measurement result of the UE on a radio channel of the second RAT, and at least one of the following information: the failure cause or the configuration part which is not able to be used in the second configuration;
wherein the second configuration is a configuration of the radio resource of the second RAT performed by the second network element for the UE.

4. The method of claim 2, wherein the report information is coded by using abstract syntax notation (ASN.1) corresponding to the first RAT; and
wherein the processing, by the first network element, the response message comprise: decoding, by the first network element, the report information, and performing a radio resource management decision according to the report information.

5. The method of claim 2, wherein the report information is coded by using ASN.1 corresponding to the second RAT, and is carried in a container of the response message; and
wherein the processing, by the first network element, the response message comprise:
forwarding, by the first network element, the container to the second network element, and after the second network element decodes the report information in the container, performing, by the second network element, a radio resource management decision according to the report information.

6. The method of claim 4, wherein
a result of the radio resource management decision is to release the second network element, or switch the second network element, or reconfigure the radio resource of the second RAT by the second network element.

7. The method of claim 6, wherein
in response to determining that the result of the radio resource management decision is to release the second network element, the method further comprises: notifying, by the first network element and through the SRB, the UE to release the radio resource of the second RAT;
in response to determining that the result of the radio resource management decision is to switch the second network element, the method further comprises: receiving, by the first network element, first reconfiguration information of radio resource reconfiguration of a new second RAT sent by a new second network element after the second network element is switched, and sending the first reconfiguration information to the UE through the SRB; and
in response to determining that the result of the radio resource management decision is to reconfigure the radio resource of the second RAT by the second network element, the method further comprises: receiving, by the first network element, second reconfiguration information of radio resource reconfiguration of the second RAT sent by the second network element, and sending the second reconfiguration information to the UE through the SRB.

8. A first network element, comprising:
at least one processor configured to:
receive via a receiver, using a first radio access technology (RAT) and through a signaling radio bearer (SRB) of the first RAT, a response message returned by a user equipment (UE), the SRB established between the first network element and the UE, wherein the response message carries report information about failure of a radio resource configuration of a second RAT; and
process the response message,
wherein the first network element and a second network element using the second RAT simultaneously provide a communication service for the UE over a radio interface, the at least one processor configured to establish an only control plane interface between the UE and a core network, and the first RAT is different from the second RAT.

9. The first network element of claim 8, wherein the report information comprises at least one of:
indication information about the failure of the radio resource configuration of the second RAT; or
assistance information for assisting a network side in reconfiguring a radio resource of the second RAT.

10. The first network element of claim 9, wherein
the assistance information comprises at least one of following information: a failure cause or a configuration part which is not able to be used in second configuration; or
the assistance information comprises a measurement result of the UE on a radio channel of the second RAT, and at least one of the following information: the failure cause or the configuration part which is not able to be used in the second configuration;
wherein the second configuration is a configuration of the radio resource of the second RAT performed by the second network element for the UE.

11. The first network element of claim 9, wherein the report information is coded by using abstract syntax notation (ASN.1) corresponding to the first RAT; and
wherein the at least one processor is configured to process the response message, which includes: decoding the report information, and performing a radio resource management decision according to the report information.

12. The first network element of claim 9, wherein the report information is coded by using ASN.1 corresponding to the second RAT, and is carried in a container of the response message; and
wherein the at least one processor is configured to process the response message, which includes:
forwarding the container to the second network element, and after the second network element decodes the report information in the container, performing a radio resource management decision according to the report information.

13. The first network element of claim 11, wherein
a result of the radio resource management decision is to release the second network element, or switch the second network element, or reconfigure the radio resource of the second RAT by the second network element.

14. The first network element of claim 13, wherein
in response to determining that the result of the radio resource management decision is to release the second network element, the at least one processor is configured to: notify, through the SRB, the UE to release the radio resource of the second RAT;
in response to determining that the result of the radio resource management decision is to switch the second network element, the at least one processor is configured to: receive, via the receiver, first reconfiguration information of radio resource reconfiguration of a new second RAT sent by a new second network element after the second network element is switched, and send, via a transmitter, the first reconfiguration information to the UE through the SRB; and in response to determining that the result of the radio resource management decision is to reconfigure the radio resource of the second RAT by the second network element, the at least one processor is configured to: receive, via the receiver, second reconfiguration information of radio resource reconfiguration of the second RAT sent by the second network element, and send, via the transmitter, the second reconfiguration information to the UE through the SRB.

15. A radio resource configuration method, comprising:
receiving, by a user equipment (UE), a message from a first signaling radio bearer (SRB) of a first radio access technology (RAT), the first SRB being established between the UE and a first network element of the first RAT, wherein the message carries information of a first configuration for a radio resource of the first RAT; and in response to determining that the UE fails to configure the radio resource of the first RAT according to the information of the first configuration, sending, by the UE through a second SRB, of a second RAT, established between a second network element and the UE, a response message of the radio resource configuration to indicate a failure of the radio resource configuration of the first RAT, wherein:
the response message comprises assistance information which includes a measurement result of the UE on a radio channel of the first RAT, and a failure cause;
sending the response message comprises reporting the assistance information to the second network element; and
the first network element and the second network element simultaneously provide a communication service for the UE.

16. The radio resource configuration method of claim 15, wherein
the first configuration is determined by the first network element for the UE;
the second network element establishes an only control plane interface between the UE and a core network among the first network element and the second network element; and
the first RAT is different from the second RAT.

17. The radio resource configuration method of claim 15, wherein the response message of the radio resource configuration comprises a message for secondary cell group (SCG) failure information.

18. A user equipment (UE), comprising a memory and a processor, wherein:
the memory is configured to store program codes; and
the processor is configured to execute the program codes to perform:
receiving a message from a first signaling radio bearer (SRB), of a first radio access technology (RAT), the first SRB being established between the UE and a first network element of the first RAT, wherein the message carries information of a first configuration for a radio resource of the first RAT; and in response to determining that the configuration of the radio resource of the first RAT performed according to the information of the first configuration fails, sending, through a second SRB, of a second RAT, established between a second network element and the UE a response message of the radio resource configuration to indicate a failure of the radio resource configuration of the first RAT, wherein:
the response message comprises assistance information which includes a measurement result of the UE on a radio channel of the first RAT, and a failure cause;
sending the response message comprises reporting the assistance information to the second network element; and
the first network element and the second network element simultaneously provide a communication service for the UE.

19. The UE of claim 18, wherein:
the first configuration is determined by the first network element for the UE;
the second network element establishes an only control plane interface between the UE and a core network among the first network element and the second network element; and
the first RAT is different from the second RAT.

20. The UE of claim 18, wherein the response message of the radio resource configuration comprises a message for secondary cell group (SCG) failure information.

* * * * *